United States Patent [19]

Cook

[11] Patent Number: 5,234,100
[45] Date of Patent: Aug. 10, 1993

[54] CONVEYOR IDLERS AND ROLLERS AND BEARING HOUSING ASSEMBLIES FOR THEM

[75] Inventor: Anthony V. Cook, Hallow, England

[73] Assignee: Edwin Lowe Limited, Birmingham, England

[21] Appl. No.: 739,105

[22] Filed: Jul. 31, 1991

[30] Foreign Application Priority Data

Oct. 4, 1990 [GB] United Kingdom ............... 9021552

[51] Int. Cl.⁵ ............................................. B65G 39/10
[52] U.S. Cl. ................................. 198/842; 384/518; 384/563
[58] Field of Search ............... 384/517, 518, 563, 477, 384/486, 546; 198/842

[56] References Cited

U.S. PATENT DOCUMENTS

| | | | |
|---|---|---|---|
| 1,906,464 | 5/1933 | Hapgood | 384/563 X |
| 2,509,587 | 5/1950 | Creson | 384/518 |
| 2,736,617 | 2/1956 | Lippmann | 384/563 |
| 3,554,620 | 1/1971 | Dalton . | |
| 4,227,755 | 10/1980 | Lundberg | 384/518 |
| 4,364,615 | 12/1982 | Euler | 384/517 |
| 4,606,659 | 8/1986 | Hogan | 384/518 |
| 4,643,300 | 2/1987 | Morrison | 198/842 |
| 4,699,528 | 10/1987 | Gotman | 384/518 X |
| 4,732,495 | 3/1988 | Brandenstein et al. | 384/518 |
| 4,913,564 | 4/1990 | Stephan et al. | 384/518 |
| 4,972,939 | 11/1990 | Uttke et al. | 198/842 X |

FOREIGN PATENT DOCUMENTS

| | | |
|---|---|---|
| 75080/74 | 5/1976 | Australia . |
| 3027869 | 3/1982 | Fed. Rep. of Germany . |
| 3139435 | 8/1982 | Fed. Rep. of Germany . |
| 3215888 | 11/1983 | Fed. Rep. of Germany . |
| 1135722 | 5/1957 | France . |
| 2024264 | 8/1970 | France . |
| 1062112 | 3/1967 | United Kingdom . |
| 1288794 | 9/1972 | United Kingdom . |
| 1399430 | 7/1975 | United Kingdom . |
| 2059011 | 4/1981 | United Kingdom . |
| 2158525 | 11/1985 | United Kingdom . |

*Primary Examiner*—D. Glenn Dayoan
*Attorney, Agent, or Firm*—Leydig, Voit & Mayer

[57] ABSTRACT

A bearing housing assembly for a roller includes a housing; bearings provided in the housing and having first and second bearing components provided in the housing with the components being relatively rotatable, a retaining cup holding the components in the housing, and a resilient biasing device held in the housing so as to transmit force to at least one of the components so as to urge the components relative to the housing. The biasing device is preferably a frusto-conical spring and the bearings are preferably taper roller bearings.

19 Claims, 4 Drawing Sheets

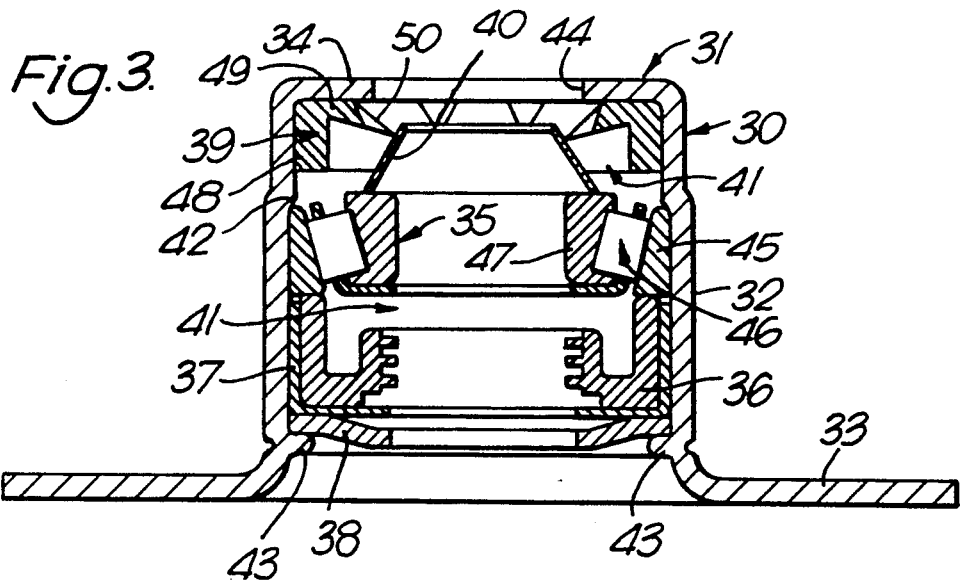
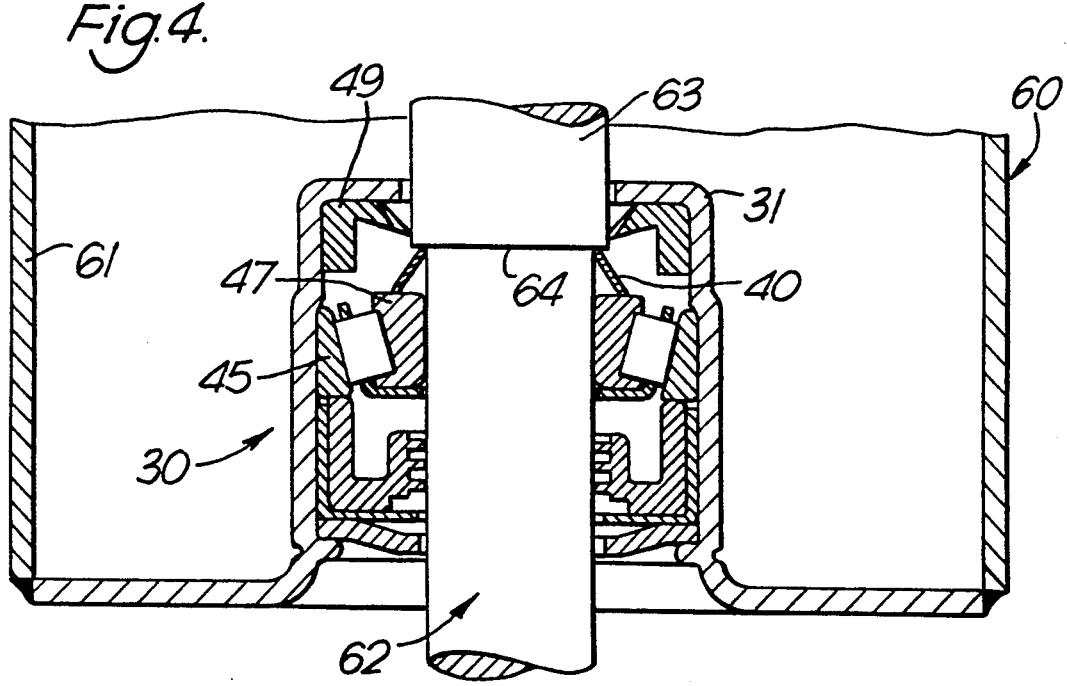

CONVEYOR IDLERS AND ROLLERS AND BEARING HOUSING ASSEMBLIES FOR THEM

BACKGROUND OF THE INVENTION

This invention relates to heavy duty industrial conveyor rollers (also known as idlers) such as may be used in many kinds of industrial conveyors, especially (but not exclusively) belt conveyors, to bearing housing assemblies for conveyor rollers, and to the methods of manufacturing such assemblies and rollers.

The movement of bulk materials within industry is frequently carried out by means of the utilisation of belt conveyors. Some common examples of materials which are moved by belt conveyors are quarried and mined materials; solid fuel for power stations; iron ore and related materials for the production of steel; and the loading and off loading of bulk materials into and from commercial shipping.

A typical belt conveyor is generally comprised of a moving flexible belt carried over a series of evenly spaced roller stations forming a conveyor track. Such roller stations typically comprise three rollers arranged in a flat bottomed V shaped configuration, otherwise known as a troughing configuration. One kind of known roller comprises an outer cylindrical steel tube having a bearing housing assembly welded to it at each end, and having a central spindle/shaft which passes through the tube, the tube being rotatably mounted upon the spindle by means of the aforementioned bearing housing assemblies. The spindles are supported in any convenient known manner. One known form of bearing housing assembly comprises a cylindrical housing portion having a radially outwardly extending flange at one end, and an annular radially inwardly extending flange at the other end, and inner and outer ball bearing races held in the top-hat shaped housing by means of an annular closure plate provided at said one end. The spindle passes through the central holes int he inwardly extending flange, the ball bearing inner race, and the annular closure plate. The ball bearing race is conventionally lubricated, and a protective seal for the ball bearing is also provided within the structure of the roller bearing housing assembly.

Current known designs of rollers for belt conveyors, including the kind described above, usually work well—but the roller bearing housing assemblies within such designs often deteriorate rapidly and fail prematurely and they are also awkward and expensive to manufacture because of the narrow manufacturing tolerances required. It is difficult to automate the assembly of such bearing housing assemblies, whilst still adhering closely to these vary narrow manufacturing tolerances. Indeed most current designs of bearing housing assemblies are at least partially manually assembled. Furthermore, welding bearing housing assemblies to the cylindrical steel tube is another critical operation because of the same requirement to adhere closely to very narrow manufacturing tolerances. For example, the bearing housing assemblies must be correctly aligned with the vertical face of the cut end of the tube, and at the same time with the central axis of the tube. Additionally both the tube and the spindle/shaft must be cut exactly to the correct length required. Furthermore, the linear distance between the two inner location points upon the spindle must be very accurately controlled. Failure to adhere closely to any of these manufacturing requirements will lead to premature failure of the bearing housing assembly, as already mentioned.

SUMMARY OF THE INVENTION

According to a first aspect the invention comprises a prefabricated bearing housing assembly comprising a housing, bearing means provided in the housing and having first and second bearing components provided in the housing with the components being relatively rotatable, retaining means holding the components in the housing, and resilient biasing means held in the housing, and resilient biasing means held in the housing and in use transmitting a force to the components so as to urge at least one of the components relative to the housing.

The biasing means thus resiliently urges the bearing components in a single direction at all times and may automatically achieve zero clearance between the first and second bearing components, as well as always urging the bearing means towards one part of the housing. This reduces the tendency for the bearing means to vibrate in the housing, or "chatter" between forward and rearward axial positions upon the spindle/shaft within the bearing housing assembly which can also reduce wear of the bearing housing assembly and consequently of the central spindle/shaft of the conveyor belt.

The bearing housing assembly may comprise a discrete unit for supply for subsequent assembly to a roller, such as an idler roller. The unit is thus a self-contained pre-fabricated cartridge and its tolerances are set during manufacture of the cartridge, rather than during installation.

Preferably the biasing means acts on the housing and may be provided between an end flange of the housing and the bearing means. The two components are preferably held between the end flange and a plate extending transversely of the bearing means.

The plate is preferably held in place by radial crimping or deformation of the housing.

The bearing means is preferably a taper roller bearing, and may be a two-part taper roller bearing, the biasing means acting so as to bias the two components of the bearing together.

A seal or other component, such as a packing component, may be interposed between a radial flange of the housing and the biasing means, the biasing means acting on the seal or other component and transferring a force to the radial flange.

The housing may be a cup, and may have a further flange spaced from its end flange.

The biasing means may comprise a frustro-conical sprig.

The biasing means may be provided wholly within the housing.

According to a second aspect of the invention we provide a roller comprising an outer member rotatable about a central spindle, characterised in that the outer member is rotatably mounted on the spindle by means of at least one bearing housing assembly in accordance with the first aspect of the invention.

Preferably, the roller has a bearing housing assembly in accordance with the first aspect of the invention at each end.

The roller may have a spindle/shaft which incorporates shoulder or other abutment means against which the biasing means transmits force. The biasing means may engage the shoulder. The outer member is preferably axially movable between two abutment means provided on the spindle, with the biasing means of each assembly acting against respective abutment means, the biasing means defining the axial position of the outer member relative to the spindle. The biasing means preferably act as shock absorbers for forces transmitted axially of the roller.

According to a third aspect the invention consists in a belt conveyor provided with rollers in accordance with the second aspect of the invention.

According to a fourth aspect the invention consists of a method of manufacturing a prefabricated bearing housing assembly comprising picking the components of the bearing housing assembly upon a gathering and compressing tool using a single straight line movement of the tool; carrying the components to a housing and introducing them into the housing; and forming retaining means in the walls of the housing to hold the rearmost component in the housing.

the method is preferably automated.

According to a fifth aspect the invention consists a method of controlling roller shaft end float comprising using biasing means to control the axial movement of the outer member of a roller relative to a roller shaft.

The method preferably comprises providing the biasing means in a self-contained assembly which is fixed to the outer member and mounted over the shaft. Alternatively the self-contained assembly could be fixed to the shaft.

BRIEF DESCRIPTION OF THE DRAWINGS

Bearing housing assemblies and conveyor rollers will now be described by way of example only with reference to the accompanying drawings of which:

FIG. 3 shows a bearing housing assembly in accordance with the first aspect of the invention;

FIG. 4 shows a part of a roller in accordance with the second aspect of the invention provided in a conveyor in accordance with the third aspect of the invention;

DESCRIPTION OF THE PREFERRED EMBODIMENTS

Figure 1:
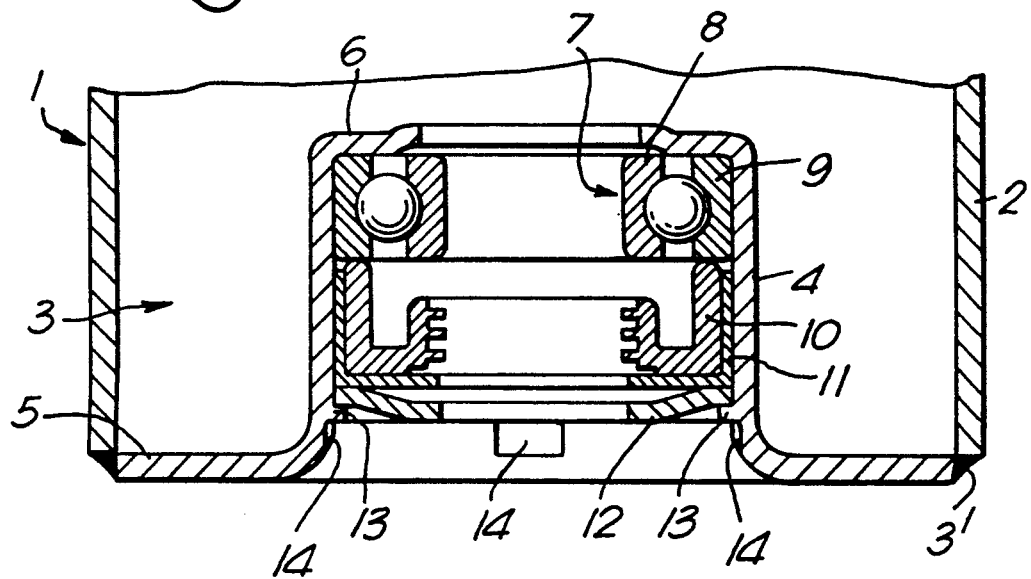
FIG. 1 illustrates a known kind of conveyor roller.

FIG. 1 shows a known roller 1 for a belt conveyor comprising a cylindrical tube 2 having a bearing housing assembly 3 welded to each end. The welding seam is indicated at reference number 3'. The bearing assembly comprises a cylindrical body portion 4 having an outwardly directed radial flange 5 at one end and an inwardly radially directed annular flange 6 at the other end. The flange 5 is welded to the tube 2. Each assembly also includes a ball bearing 7 having radially inner and outer races 8 and 9, a seal 10, a seal-retaining cup 11, and a closure plate 12. The closure plate 12 is prevented from moving axially away for the bearing 7 by angularly spaced retaining lugs 13 formed on the inner face of the body portion 4 by the local flare formed by gouging shallow recesses 14 in the inner face of the body portion by moving a broaching or gouging tool axially of the body portion 4.

Figure 2:
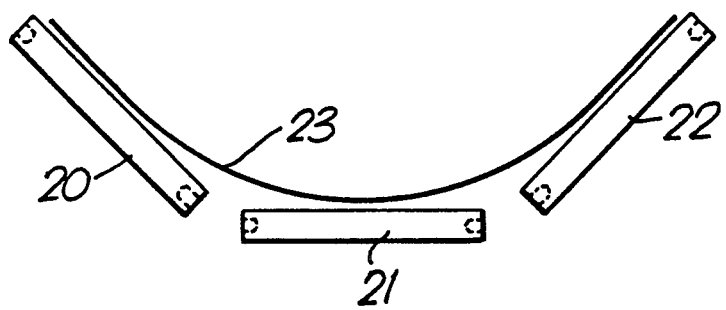
FIG. 2 schematically illustrates the arrangement of rollers in a typical belt conveyor.

The roller 1 is used in an endless belt conveyor, three idler rollers 20, 21, 22 usually being arranged in a troughed configuration as shown in FIG. 2 to support a belt 23.

FIG. 3 shows a bearing housing assembly 30 having a housing 31 which has cylindrical body portion 32 provided with a radially outwardly extending flange 33 at one end and an annular radially inwardly extending flange 34 at the other end; a two part taper roller thrust bearing 35 provided within the body portion 32 of the housing 31; a shaft or bearing seal 36 and associated seal-retaining cap 37 adjacent and to one side of the bearing 35; an annular retaining washer 38 adjacent the cap 37; a second seal 39 provided adjacent the flange 34; a spring 40 acting between the bearing 35 and the second seal 39; and lubricating grease 41 provided between the two seals 36 and 39.

The body portion 32 of the housing has an inwardly stepped annular shoulder 42, and inwardly projecting retaining lugs 43 adjacent the flange 33.

The inwardly extending flange 34 defines a circular aperture 44. The bearing 35 comprises an outer race 45, a roller cage 46, and an inner race or cone 47. The roller cage 46 and inner race 47 are provided as a unitary component, with axially spaced annular shoulders of the inner race holding the roller cage 46 and the inner race 47 together. The shaft or bearing seal 36 and seal-retaining cap 37 are also provided as a unitary component, the seal 36 being a tight friction fit int eh cap 37. The second seal 39 has a cylindrical portion 48 from which a radial portion 49 extends inwards. A sealing lip 50 is provided at the radially inner edge of the radial portion 49 and projects inwards. The spring 40 is frustro-conical, with its wider portion bearing against the inner race 47. The narrower portion of the spring 40 defines a circular aperture of substantially the same diameter as aperture 44, and the internal diameter of the inner race 47, and the diameter of the central hole of the seal 36.

The seal 39 is a friction fit inside the body portion 32 of the housing 31. The outer race 45 is held against the inwardly projecting shoulder 42 by the upper edge of the outer cylindrical wall of the seal 36, and the seal 36 and its retaining cap 37 are held in place by the washer 38 which in turn is held in place by the lugs 43. There is a degree of axial force between the components trapped between the lugs 43 and the shoulder 42.

When the bearing housing assembly 30 is in its "on the shelf" state as shown in FIG. 3 the spring 40 is very slightly axially compressed between the sealing lip 50 and the inner race 47 and urges the race 47, and roller cage 46, against the outer race 45. The lip 50 is also a resilient biasing means and biases the spring 40 towards the race 47. Thus the spring 40 and lip 50 bias the inner race 47 towards the outer race 45 to maintain zero clearance between the races. The axial reaction force to the spring and lip 50 is transmitted to flange 34 via seal 39 when the assembly is an isolated unit, as shown in FIG. 3.

The assembly 30 is thus a convenient pre-assembled component which can be supplied to the manufacturers of conveyor rollers and simply requires mounting over the roller shaft and attaching to the end of the roller tube. The roller manufacturer need have no expertise in setting bearing clearances. Furthermore, the precise relevant linear dimensions of the prepared tub e to which the assemblies 30 are to be attached, and the precise linear distance between the opposing shoulders 64 of the spindle/shaft 63 over which the assemblies are to be mounted are no longer of critical importance since the resilient biasing means in the assemblies can effectively compensate for small variations in these previously critical linear dimensions of roller tubes and shafts.

FIG. 4 shows one end of an idler roller 60 provided with a bearing housing assembly similar to that shown in FIG. 3.

The idler roller 60 comprises a cylindrical tube 61 fitted with an assembly 30 welded to each end of the tube, and a central spindle 63 passing through the tube 61. The spindle 63 has outer portions 62 which are supported in a convenient way. Annular shoulders 64 are provided on the spindle 63. The shoulders 64 are provided within the housing 31, and within the radial portion 49 of the seal 39. The outer, narrower, portion of each spring 40 bears against a respective annular shoulder 64 and urges the inner races 47 against their respective outer races 45 positively biasing the two races of each of the bearings 35 together to achieve substantially zero clearance between the races.

It will be appreciated that the two opposing shoulders 64 of the spindle 63 are spaced apart by an appropriate distance related to the corresponding linear dimension of the roller tube 61 such that the two springs 40 are compressed a little way, bu such that the tube 61 nd the housings 32 may move axially relative to the spindle 63 within the constraints defined by the springs 40, the shoulders 64, and the surfaces of the inner races or cones 47 against which the springs 40 bear.

When the conveyor roller 60 is used in a horizontal configuration (for example as the roller 21 of FIG. 2) the two springs 40 may centre the tube 61 between the two shoulders 64.

When the conveyor roller is used in a configuration inclined to the horizontal (for example as the roller 20 of FIG. 2) the weight of the tube 61 tends to urge the tube towards the lowermost shoulder 64 of the inclined spindle. The springs 40 are strong enough to support the weight of the inclined tube 61, so that the lower spring 40 is not fully compressed. The upper spring 40 also still exerts an axial force on its upper bearing 35, urging tis race 47 against the roller cage 46 and towards the race 45. A positive force is still applied by upper spring 40 through its bearing to maintain zero clearance.

In an alternative roller the lower spring 40 of an inclined roller may be fully compressed by a combination of the weigh of the tube 61 and related forces acting upon the tube 61 axially in the direction of the lower spring 40. The lower spring 40 may even be omitted since the lower bearing will always be compressed by gravitational forces. However, the upper spring 40 would still continue to exert an axial force on its upper bearing 35, as outlined above.

The roller of FIG. 4 not only uses a prefabricated bearing housing assembly incorporating a taper roller bearing, which was hitherto thought to be impractical in a conveyor roller, but also has a degree of internal springing. Since the roller when inclined is always supported by a partially compressed spring 40 any sudden shocks, such as may be caused by a quantity of material being thrown onto the belt of a conveyor supported by the roller, can be partially cushioned by the springs 40 which act as shock absorbers. This increases the working life of the roller 60.

Similarly, sudden sideways forces applied to a horizontal roller, such as the sideways component of the force of a quantity of material being thrown onto the belt of a conveyor, are cushioned by the springs 40.

The springs 40 thus act as shock absorbers to cushion shocks applied axially of the roller, or at least the axial components of such shocks.

Figure 7:
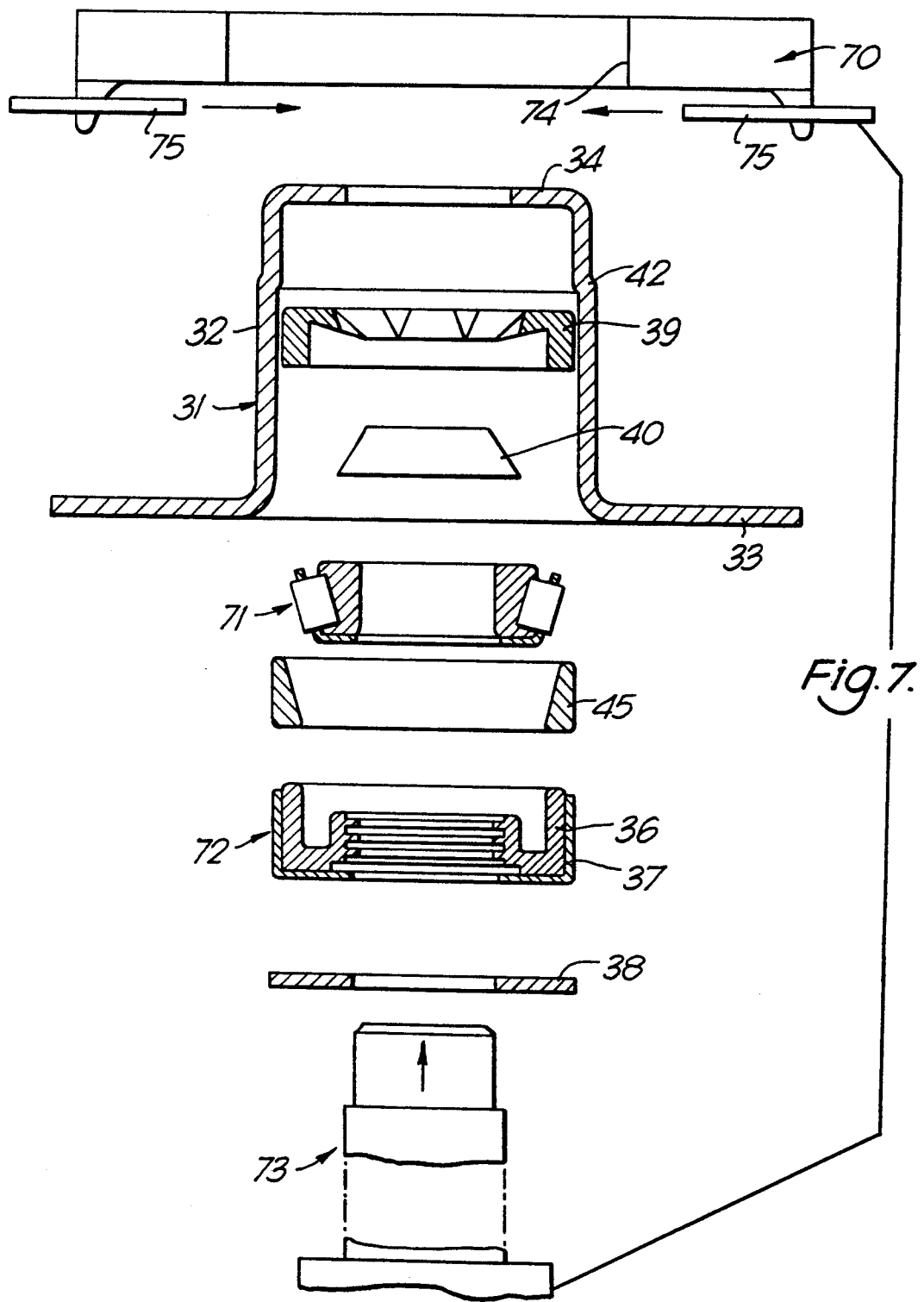
FIG. 7 illustrates the manufacture of the bearing housing assembly of FIG. 3.

FIG. 7 illustrates the manufacture of the bearing housing assembly 30. A pressed steel housing, the housing 31, is located adjacent a punch tool 70 and the second seal 39, spring 40, a first unit 71 comprising the inner race 47 comprising the first seal 36 and retaining cap 37, and the retaining washer 38 are all positioned automatically in a line as illustrated in FIG. 7. A collecting and compressing tool 73 moves towards the punch tool 70 in a straight line and in a single movement picks up the washer 38, the second unit 72, the outer race 45, the first unit 71, the spring 40, and the second seal 39, the tool 73 entering the components' central apertures to "spear" them onto the tool. The body portion 32 of the housing 31 is pushed through an aperture 74 in the punch tool 70 until the flange 33 engages against the tool 70. Further forward movement of the tool 73 then pushes washer 38, unit 72, race 45, unit 71, spring 40, and seal 39 fully into the housing to their predetermined specified positions. At this point the spring 40 is partially compressed, the seal 39 engages against flange 34 of the housing, and the outer race 45 engages against shoulder 42 of the housing.

The punch tool 70 then drives angularly spaced punches 75 radially into the outer walls of the body portion 32 to punch radial recesses in the outer surface of the body portion 32 and form corresponding radial projections, the lugs 43, at the inner surface of the walls of the body portion 32. The lugs 43 are formed at such a location that there is an axial force transmitted from shoulder 42 to the lugs 43 via the components located between them. The compressing tool 73 is then withdrawn and the spring 40 expands to urge the inner race 47 towards the outer race 45. The punches which form the recesses and lugs 43 have a circumferential extent, so that the lugs 43 comprise angularly spaced circumferentially elongated ridges.

The manufacture of the bearing housing assembly 30 is an automated process. The spacing between shoulder 42 and lugs 43 is predetermined, as is the pressure which the spring 40 will exert upon the inner race 47 in the assembled assembly 30.

When the spring 40 is a Belleville washer a further advantage of the assembly 30, and the roller 60, is that a Belleville washer exerts a substantially constant force over a range of deflections, and this feature can be sued to give a substantially constant biasing force on the bearing 35 during its normal operation conditions.

The invention controls bearing clearances, shaft end float, line contact and preloading of the bearings in its applicability to FIGS. 3 and 4.

Figure 5:
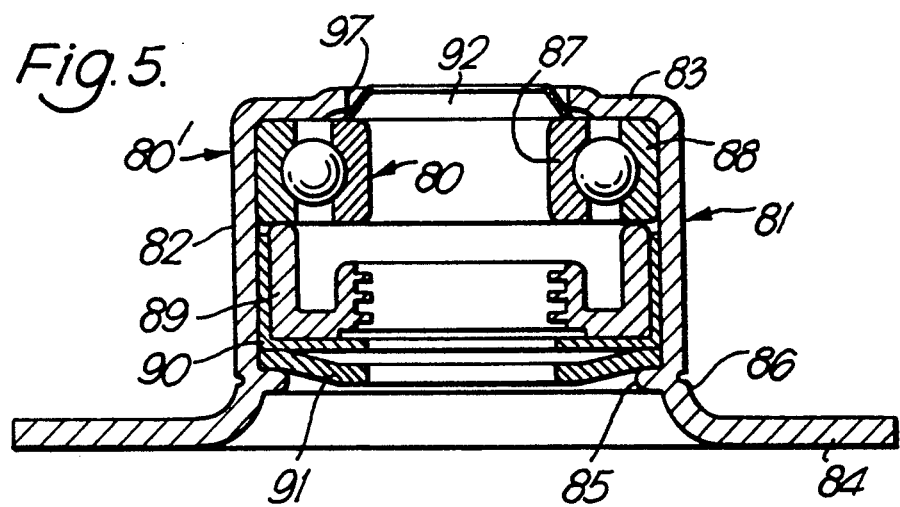
FIG. 5 shows another bearing housing assembly in accordance with the first aspect of the invention.
Figure 6:
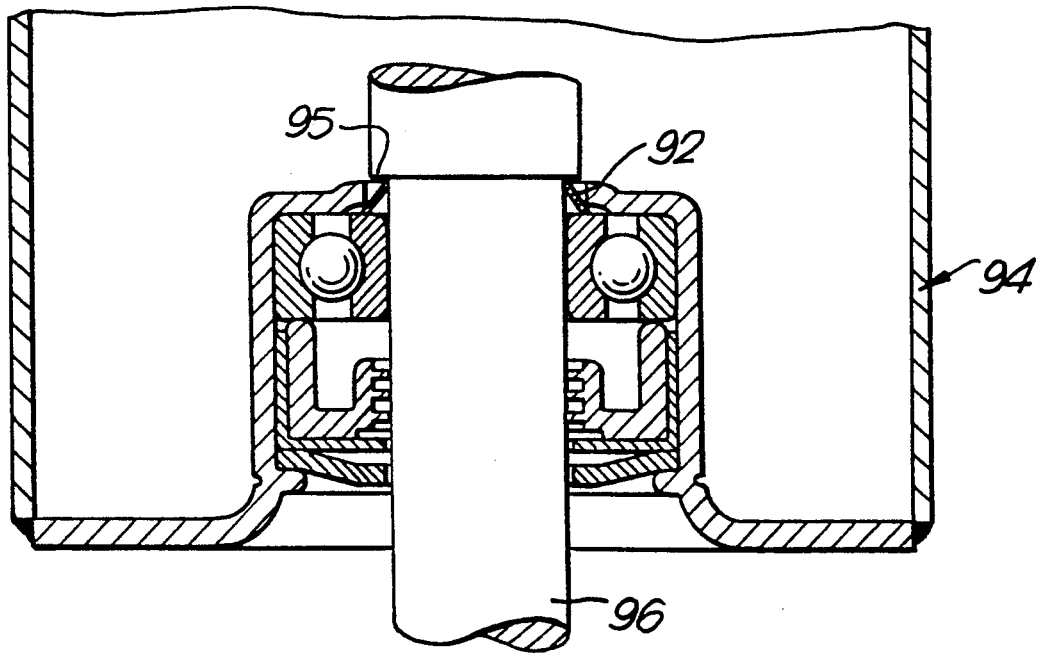
FIG. 6 shows the bearing housing assembly of FIG. 5 is use.

The invention is also applicable to ball bearing prefabricated bearing housing assemblies. FIGS. 5 and 6 illustrate bearing housing assembly 80' comprising a ball bearing assembly 80 in a housing 81 having a body portion 82, radially inwardly and outwardly extending flanges 83 and 84, lugs 85 and corresponding radially formed indentations 86. The flange 83 defines a central aperture 97. The ball bearing 80 has an inner race 87 and an outer race 88. A seal 89 and retaining cup 90 are provided, as is a retaining washer 91. A resilient spring 92 bears against the inner race and the flanges 83 of the housing when the bearing assembly 80 of FIG. 5 is in its free state.

The spring 92 is of frustro-conical; shape with its widest end engaging inner race 87 and its frustro-conical surface engaging the inner lip of the flange 83 when the assembly 80 is in its free state. The narrower end of the spring 92 projects through the aperture defined by the flange 83 in the free state of the assembly 80'.

A roller 94 incorporating two bearing housing assemblies 80' is illustrated in FIG. 6 which shows the narrower end of the spring 92 bearing against a shoulder 95 of a central spindle 96 of the roller 94, in a similar manner to the arrangement shown in FIG. 4, with the shoulder 95 moving through the aperture 97 to locate within the body portion 82 of the housing 81. The spring 92 may extend beyond the bounds of the housing 81 in FIG. 6.

The springs 92 of the roller of FIG. 6 help to control shaft end float (the position of the tube of the roller 94 is controlled relative to the shaft 96 by the springs 92). The springs 92 also perform a shock-absorbing function as described with reference to FIG. 4, and alleviate the need to control accurately the appropriate linear dimension of the outer tube of the roller, or the matching linear dimension between the two opposing shoulders 95 upon the roller spindle 96.

The bearing housing assembly 80 is made in a similar manner to that of bearing housing assembly 30, each component being picked up in a single automated movement and the washer 91 being retained in place by a radially indented lug 85.

It will be appreciated that a rollers 60 or 94 could be provided with a bearing housing assembly 30 or 80' at only one end and that they need not be conveyor rollers.

An endless conveyor belt fitted with rollers 60 or 94 will wear well and furthermore rollers 60 and 94 can be manufactured and installed by unskilled labour.

The bearing housing assemblies 30 and 80' may be greased for life during the manufacture process and comprise a sealed unit, or alternatively they may be made as regreasable units which will require periodic lubrication in the field.

The present embodiments have no need for an external or internal bearing adjustment mechanism, such as a nut on a threaded shaft as is often used with taper roller bearings. A further advantage of continually biasing the bearing is that any wear in the bearing is automatically taken up by the spring during the working life of the bearing and there is no need for separate wear-adjustment maintenance checks or equipment.

The incorporation of biasing means in the self-contained bearing housing assembly enables the manufacturing process of conveyor rollers themselves to be rendered largely self-regulating. It will be appreciated that the second seal 39 of the embodiment of FIGS. 3 and 4 may contribute to the biasing of the bearing and may comprise resilient biasing means in it s own right, either in addition to the spring 40 or instead of its.

The problems or shaft mis-alignment, bearing clearances, bearing preload, linear dimensions of prepared idler tubes, linear spacing between the two bearing in-board location points on the shaft, and shaft end float are ameliorated all at once, rather than treating each problem separately.

It will also be appreciated that the principle of using resilient biasing means to control bearing clearances and associated manufacturing tolerances with regard to prefabricated bearing housing assemblies and associated components, may be applied to applications other than bearing housing assemblies for rollers.

I claim:

1. A prefabricated bearing housing assembly and unit for a roller comprising a housing having mounting means adapted to secure said end unit to the end of a roller, bearing means in said housing having a first, inner, bearing race component and a second, outer, bearing race component with said components being relatively rotatable, retaining means for holding said components in said housing, and resilient biasing means in said housing for transmitting an axial force to said components so as to urge said components axially relative to said housing, wherein said housing, bearing components, retaining means, and biasing means are a self-contained, prefabricated, cartridge end unit.

2. A prefabricated end unit according to claim 1, wherein said housing is made of pressed steel.

3. A prefabricated end unit according to claim 1, wherein said biasing means acts on said housing.

4. A prefabricated end unit according to claim 1, wherein said housing has a cylindrical body portion having a mounting flange, comprising said mounting means, at one end thereof and an end flange provided at its other end, said biasing means acting between said end flange and said bearing means.

5. A prefabricated end unit according to claim 4, wherein said retaining means comprises a plate provided extending transversely of said bearing means and said two bearing components are held between said flange and said plate.

6. A prefabricated end unit according to claim 5, wherein said plate is held in place by radial crimping or deformation of said housing.

7. A prefabricated end unit according to claim 1, wherein said bearing means is a taper roller bearing, said biasing means acting so as to bias said components of said bearing means together.

8. A prefabricated end unit according to claim 1, wherein said housing has a radial flange and a seal is interposed between said radial flange of said housing and said biasing means, said biasing means acting on said seal or other component and transferring a force to said radial flange.

9. A prefabricated end unit according to claim 1, wherein said biasing means bears against the inner race component.

10. A prefabricated end unit according to claim 1, wherein said biasing means comprise a frusto-conical spring.

11. A bearing housing assembly according to claim 1, wherein said biasing means is provided wholly within the housing.

12. A prefabricated end unit according to claim 1, wherein said housing has a shoulder and said outer race component is located against said shoulder.

13. A prefabricated bearing housing assembly end unit for a roller comprising a housing having mounting means adapted to secure said end unit to the end of a roller, bearing means in said housing having a first, inner, bearing race component and a second, outer, bearing race component with said components being relatively rotatable, retaining means for holding said components in said housing, and resilient biasing means in said housing for transmitting an axial force to said components so as to urge said components axially relative to said housing, wherein said housing, bearing components, retaining means, and biasing means are provided as a self-contained, prefabricated, cartridge end unit, and wherein said outer race component has a friction-fit engagement with said housing.

14. A prefabricated end unit according to claim 13, wherein said housing has a shoulder and said outer race component is located against said shoulder.

15. A roller comprising an outer member rotatable about a central spindle, wherein said outer member is rotatably mounted on said spindle by means of at least one prefabricated bearing housing assembly end unit, and wherein said prefabricated end unit comprises a housing having mounting means securing said cartridge end unit to the end of said outer member, bearing means in said housing having a first, inner, bearing race component and a second, outer, bearing race component with said components being restively rotatable, retaining means holding said components in said housing, and resilient biasing means in said housing for transmitting an axial force to said components so as to urge said components axially relative to said housing, wherein said housing, bearing components, retaining means, and biasing means re a self-contained, prefabricated, cartridge end unit.

16. A roller according to claim 15, wherein said roller has a spindle/shaft having abutment means against which said biasing means transmits force.

17. A roller according to claim 15, wherein a said prefabricated end unit is provided at each end of said roller and said outer member is axially movable between two abutment means provided on said spindle, with said biasing means of each said prefabricated end unit acting against respective abutment means, said biasing means defining the axial position of said outer member relative to said spindle.

18. A roller according to claim 15, wherein said outer race has a friction-fit engagement with said housing and said inner race has a friction-fit engagement with said spindle.

19. A prefabricated bearing housing assembly end unit for a roller comprising a housing having mounting mans adapted to secure said end unit to the end of a roller, bearing means provided in said housing having a first, inner, bearing race component and a second, outer, bearing race component with said components being relatively rotatable, retaining means holding said components in said housing of said end unit, and resilient biasing means in said housing, wherein said housing, bearing components, retaining mans, and biasing means are a self-contained, prefabricated, cartridge end unit, and wherein said end unit is a separate unit in which before attachment to the end of a roller said resilient biasing means exerts no substantial axial force on said bearing race components, but said end unit being arranged such that when said end unit is attached to an end of a roller, and said roller is mounted on a shaft, said biasing means are adapted to engage a part of said shaft in use and transmit an axial force to said race components so as to urge them axially relative to said housing.

* * * * *